E. N. KENT.
Amalgamator.
No. 13,879.
Patented Dec. 4, 1855.
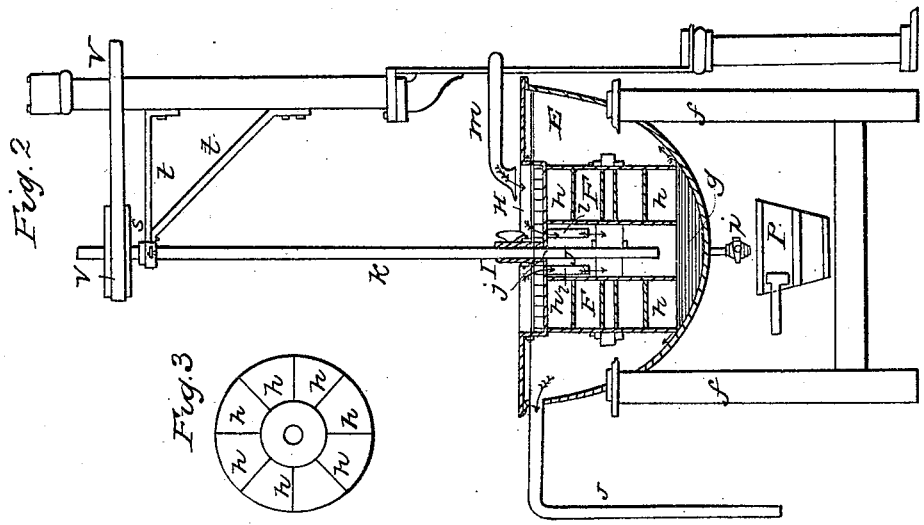
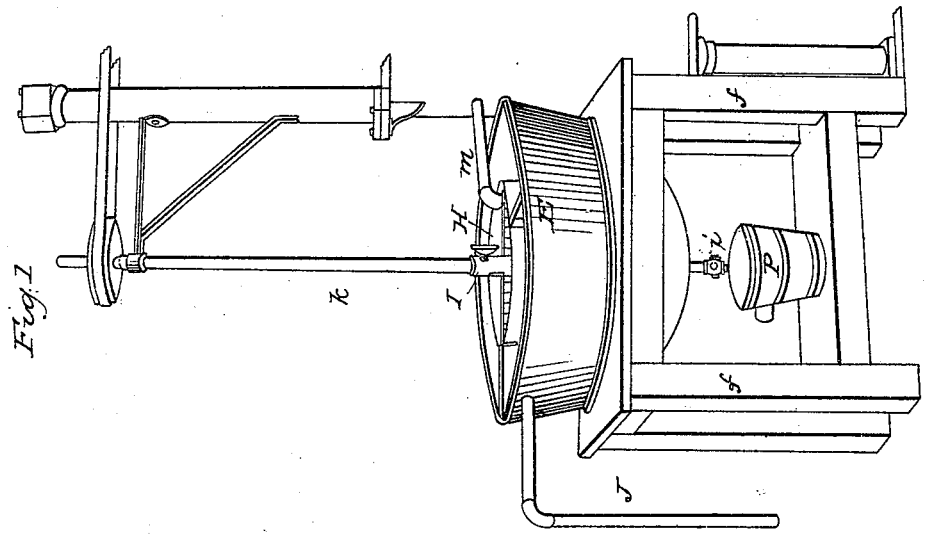
Witnesses
Ch M Kelley
T. S. W. Bishop
Inventor
Edward N Kent

UNITED STATES PATENT OFFICE.

EDW. N. KENT, OF NEW YORK, N. Y.

AMALGAMATOR.

Specification of Letters Patent No. 13,879, dated December 4, 1855.

*To all whom it may concern:*

Be it known that I, EDWARD N. KENT, of the city of New York, in the county of New York and State of New York, have invented a new and useful Amalgamator for separating Gold and Silver; and I do hereby declare that the following is a full, clear, and exact description of the construction of the same, reference being had to the annexed drawings, making a part of this specification, in which—

Figure 1 is a perspective view; Fig. 2, a longitudinal vertical section, and Fig. 3 an interior view of the wheels F, showing the position of the paddles (*h h*).

The nature of my invention consists in the employment of double action paddle wheels which rotate on their own axis, and revolve about a vertical axis, within and in combination with a column of water in a vessel having the discharge at or near the top in contradistinction to a current of water flowing directly through the said vessel, the mode of operation of my said invention being for the purpose of causing the earthy matter containing gold to be suspended in a large body of water, that the lighter earthy substances may be loosened and carried around by the double action of the paddle wheels and separated from the particles of gold, and finally discharged at or near the top, while the particles of gold, by reason of their greater specific gravity subside to the bottom separated and cleaned. And my said invention also consists in sustaining the paddle wheels in the column of water, from above, and causing them to rotate on their axes by the weight of a heavy pan resting on their peripheries above that mercury may be employed in combination therewith at the bottom, and below the wheels, whereby the mercury is not broken up and wasted, but is kept in a quiescent state at the bottom to take up the finer particles of gold as they descend by gravity on the surface of the mercury which is thus kept clear of the earthy substances which are separated and washed off.

To enable others skilled in the art to make and use my invention, I will proceed to describe its construction and operation.

Fig. 2 is a longitudinal vertical section of my amalgamator for separating gold and silver as arranged for use, and showing all the parts as follows: E represents a semicircular iron vessel, capable of holding a large body of water, and supported by the frame work (*f f*) at a convenient height to receive the earth or powdered ore and water which passes through the pipe (*m*) into the pan H, which is in the center of the vessel E.

F, F, Figs: 2 and 3 are two paddle or water wheels with solid sides, hollow axles, and furnished each with wooden or iron paddles, (*h*). Fig. 3 shows the position of these paddles as inserted into the solid sides of the wheels F. These wheels revolve vertically under water, on their own axis and around the vertical shaft (K), to which they are firmly keyed, and which is put in motion by the belt and pulleys V, V, the upper edges bearing with friction against the bottom of the pan H, and the lower edges just skimming over the surface of the mercury (*g*), which is contained in the bottom of the vessel E, and is entirely unobstructed by any projection from the bottom, which would cause the earth or sand to remain; the shaft K and wheels F F, being supported by the collar (S); and bracket (*t t*). The cock (*i*) at the bottom is for drawing off the mercury preparatory to straining and distillation to obtain the gold or silver contained therein.

H, Fig. 2, is a heavy iron pan resting upon, and with sufficient friction to turn, the paddle wheels F F upon their own axis. This pan is confined to the center of the vessel E by arms bolted to the sides of the latter. In the center of this pan is a short tube (*j*) through which the shaft (K) passes; and outside of this central tube, are several smaller tubes (*l, l,*) level with the upper surface of the bottom of the pan, but projecting below it nearly to the axle of the wheels F F.

I is a tube connected with two or more arms supplied with teeth, and a thumb screw by which it is attached to and revolves with the shaft (K), the teeth nearly touching the bottom of the stationary pan H and serving to keep the latter free from deposits of earth or sand.

The earthy matters containing gold or silver are supplied to the amalgamators by means of a current of water passing from the pipe (*m*) into the pan H, in which they are stirred up and suspended in the water by the teeth attached to the arms I, and are carried thence by the current of water through the small feeding tubes (*l l*) into the center of the large body of water contained in the vessel E, and directly in contact with the mercury on the bottom, the surface of which is kept constantly clear by the revolving action of the paddle wheels around the shaft (K,) which also causes an outer current in the space between the wheels and the sides of the vessel, into which the earthy matters are thrown by the revolution of the paddle wheels upon their own axis, thus allowing the heavy metallic portions to fall by virtue of their greater specific gravity and remain in contact with the clean mercury until amalgamated, while the light and refuse earth is rapidly washed away.

The mercury in the amalgamator requires to be removed only about once a week or once a month, according to the quantity of material which has been passed through the apparatus. When sufficiently charged with gold or silver the amalgam is to be drawn off through the cock (i) into the pail P, which retains it and allows the water to pass off through the pipe. The amalgam is then to be strained the solid portion distilled off to obtain the gold or silver, and the fluid mercury is to be returned to the amalgamator, and if any has become lost by handling, a little more should be added so as to cause the surface of the whole to touch the paddle wheels as before.

I am aware that the fine particles of gold and silver have been separated from the foreign substances with which they are mixed, by amalgamation with mercury, by causing the said substances containing the gold or silver to pass over the surface of the mercury, on the way to the discharge, thereby greatly impeding the amalgamating operation by the passage of the foreign substances over the surface of the mercury, instead of effecting their separation and discharge above. And I am also aware that it has been attempted to effect the saparation of the fine particles of gold from the foreign substances by causing them to pass through a vessel containing water, but in that case the substances containing the gold and the mercury were stirred up together by scrapers revolving on a horizontal axle in a horizontal cylinder, and no separation of the earthy substances was effected before the contact with the mercury, and hence this does not involve the mode of operation by which I effect the separation. And I am also aware that the finer particles of gold have been separated from the foreign substances by supplying such substances through the side of a vessel and below its discharge aperture and above the amalgamating pan and agitator below, a column of water being caused to enter the said vessel above the amalgamating pan and to flow upward through the said vessel to the delivery aperture at top and passing by the supply tube through which the substances to be separated are supplied, but the said apparatus does not present the mode of operation which constitutes my invention, as the substances are supplied at a distance considerably above the agitators and are acted upon by an upward moving column of water which will have a tendency to discharge particles of gold not yet loosened from the light earthy substances, as also the minute scale like particles of gold that are readily acted upon by currents. And in the said apparatus mercury is not employed in a quiescent state, but on the contrary is acted upon by a scraper or stirrer, and in fact it could not be employed in a quiescent state as the shaft of the agitators has its support at the center of the bottom of the amalgamating pan.

I do not therefore wish to be understood as making claim broadly to an apparatus for the separation of gold or silver from foreign substances which consists of a vessel containing a column of water with mercury at the bottom, and with agitators above the mercury, and in which the substances to be separated are supplied below the surface of the water and below the discharge.

What I do claim as my invention and desire to secure by Letters Patent is—

1. The employment of double action paddle wheels, which rotate on their own axis, and revolve about a vertical axis substantially as described, within and in combination with a column of water in a vessel having the discharge at or near the top substantially as specified, and for the purpose set forth.

2. And I also claim sustaining the paddle wheels in the column of water, from above, and causing them to rotate on their axis by the weight of the heavy pan resting on their peripheries above that mercury may be employed in combination therewith at the bottom and below the wheels substantially as and for the purpose specified.

N. Y., Nov. 15th, 1855.

EDWARD N. KENT.

Witnesses:
WM. H. BISHOP,
CHAS A. WILSON.